US007603340B2

(12) United States Patent
Ngai et al.

(10) Patent No.: US 7,603,340 B2
(45) Date of Patent: Oct. 13, 2009

(54) AUTOMATIC WORKLOAD REPOSITORY BATTERY OF PERFORMANCE STATISTICS

(75) Inventors: Gary Ngai, Saratoga, CA (US); Mark Ramacher, San Carlos, CA (US); Graham Wood, El Granada, CA (US); Connie Green, San Carlos, CA (US); Venkateshwaran Venkatatamani, Redwood City, CA (US); Karl Dias, Foster City, CA (US); Benoit Dageville, Foster City, CA (US); Michael Feng, Belmont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 527 days.

(21) Appl. No.: 10/934,344

(22) Filed: Sep. 3, 2004

(65) Prior Publication Data
US 2005/0086242 A1    Apr. 21, 2005

Related U.S. Application Data

(60) Provisional application No. 60/500,869, filed on Sep. 4, 2003.

(51) Int. Cl.
*G06F 7/00* (2006.01)
*G06F 17/30* (2006.01)
(52) U.S. Cl. .................. 707/2; 707/200; 707/104.1
(58) Field of Classification Search .............. None
See application file for complete search history.

(56) References Cited

U.S. PATENT DOCUMENTS 2,883,255 A    4/1959   Anderson (Continued)

FOREIGN PATENT DOCUMENTS

JP    55-091036 A    7/1980

(Continued)

OTHER PUBLICATIONS

Chadhuri et al., "Self Managing DBMS Technology at Microsoft," Microsoft Research, Sep. 1, 2004, 35 pages.

(Continued)

*Primary Examiner*—John R. Cottingham
*Assistant Examiner*—Michael Pham
(74) *Attorney, Agent, or Firm*—Townsend and Townsend and Crew LLP (57) ABSTRACT

A self-managing workload repository infrastructure (or "AWR" for Automatic workload repository) which is useful for a database server to collect and manage useful system performance statistics. The AWR runs automatically to collect performance data about the operation of the database system, and stores the data that it captures into the database. The collection process is done inside the database, and the collection process is highly efficient as data is retrieved directly from the shared memory of the database kernel. The data captured allows both system level and user level analysis to be performed without unduly impacting system performance, e.g., by eliminating or reducing the requirement to repeat the workload in order to diagnose problems. The AWR is configured to automatically capture snapshots of statistics data on a periodic basis as well as purge stale data on a periodic basis. The captured performance data includes one or more of the top N (e.g., 20 or 30) statistics for activities involving a large set of objects, time-based statistics, cumulative statistics, sampled data and metrics and other data types.

38 Claims, 2 Drawing Sheets

U.S. PATENT DOCUMENTS

| | | | |
|---|---|---|---|
| 3,324,458 A | | 6/1967 | MacArthur |
| 3,344,408 A | | 9/1967 | Singer et al. |
| 3,351,910 A | | 11/1967 | Miller et al. |
| 4,654,806 A | | 3/1987 | Poyser et al. |
| 4,849,879 A | | 7/1989 | Chinnaswamy et al. |
| 4,994,986 A | | 2/1991 | Cihiwsky et al. |
| 5,303,166 A | | 4/1994 | Amalfitano et al. |
| 5,349,662 A | | 9/1994 | Johnson et al. |
| 5,488,648 A | | 1/1996 | Womble |
| 5,729,736 A | | 3/1998 | Gomi et al. |
| 5,734,884 A | | 3/1998 | Eberhard et al. |
| 5,778,350 A | | 7/1998 | Adams et al. |
| 5,781,703 A | | 7/1998 | Desai et al. |
| 5,796,633 A | | 8/1998 | Burgess et al. |
| 5,872,976 A | | 2/1999 | Yee et al. |
| 5,905,868 A | | 5/1999 | Baghai et al. |
| 5,960,423 A | | 9/1999 | Chadhuri et al. |
| 6,003,022 A | | 12/1999 | Eberhard et al. |
| 6,029,163 A | * | 2/2000 | Ziauddin ................ 707/2 |
| 6,035,306 A | | 3/2000 | Lowenthal et al. |
| 6,052,694 A | * | 4/2000 | Bromberg ............. 707/200 |
| 6,223,171 B1 | | 4/2001 | Chadhuri et al. |
| 6,282,570 B1 | | 8/2001 | Leung et al. |
| 6,311,175 B1 | | 10/2001 | Adriaans et al. |
| 6,363,282 B1 | | 3/2002 | Nichols et al. |
| 6,389,430 B1 | * | 5/2002 | Parker ................... 707/202 |
| 6,434,714 B1 | | 8/2002 | Lewis et al. |
| 6,467,052 B1 | | 10/2002 | Kaler et al. |
| 6,510,419 B1 | | 1/2003 | Gatto |
| 6,553,369 B1 | | 4/2003 | Guay et al. |
| 6,615,222 B2 | | 9/2003 | Hornibrook et al. |
| 6,665,815 B1 | | 12/2003 | Goldstein et al. |
| 6,671,830 B2 | | 12/2003 | Lowell et al. |
| 6,691,254 B2 | | 2/2004 | Kaler et al. |
| 6,766,318 B1 | | 7/2004 | Guay et al. |
| 6,775,676 B1 | | 8/2004 | Briam et al. |
| 6,792,460 B2 | | 9/2004 | Oulu et al. |
| 6,801,903 B2 | * | 10/2004 | Brown et al. ............... 707/2 |
| 6,804,627 B1 | * | 10/2004 | Marokhovsky et al. ...... 702/182 |
| 6,901,582 B1 | | 5/2005 | Harrison |
| 6,952,692 B1 | * | 10/2005 | Bhattiprolu et al. ............ 707/3 |
| 6,954,717 B2 | | 10/2005 | Boldt et al. |
| 6,955,302 B2 | | 10/2005 | Erdman, Jr. |
| 6,983,257 B2 | | 1/2006 | Gatto |
| 7,051,013 B2 | * | 5/2006 | Horman et al. ................ 707/2 |
| 7,085,786 B2 | | 8/2006 | Carlson et al. |
| 7,089,347 B2 | | 8/2006 | Mogi et al. |
| 7,093,169 B2 | | 8/2006 | Merriam |
| 7,139,749 B2 | * | 11/2006 | Bossman et al. ............... 707/3 |
| 7,292,961 B2 | | 11/2007 | Dias et al. |
| 7,376,682 B2 | | 5/2008 | Ramacher et al. |
| 2002/0065833 A1 | | 5/2002 | Litvin |
| 2002/0087587 A1 | * | 7/2002 | Vos et al. .................... 707/203 |
| 2002/0091708 A1 | * | 7/2002 | Vos et al. .................. 707/104.1 |
| 2002/0173997 A1 | | 11/2002 | Menard et al. |
| 2002/0178146 A1 | | 11/2002 | Akella et al. |
| 2003/0120620 A1 | | 6/2003 | Fromherz et al. |
| 2004/0044500 A1 | | 3/2004 | Lu |
| 2004/0044700 A1 | | 3/2004 | Fisher et al. |
| 2004/0059704 A1 | | 3/2004 | Hellerstein et al. |
| 2004/0064544 A1 | * | 4/2004 | Barsness et al. ............. 709/224 |
| 2004/0098265 A1 | | 5/2004 | Kelly et al. |
| 2005/0055673 A1 | | 3/2005 | Dias et al. |
| 2005/0086195 A1 | | 4/2005 | Tan et al. |
| 2005/0086246 A1 | | 4/2005 | Wood et al. |
| 2005/0086263 A1 | | 4/2005 | Ngai et al. |
| 2005/0103874 A1 | | 5/2005 | Erdman, Jr. |
| 2005/0278381 A1 | | 12/2005 | Diao et al. |
| 2006/0218450 A1 | | 9/2006 | Malik et al. |
| 2007/0022192 A1 | | 1/2007 | Nguyen et al. |

FOREIGN PATENT DOCUMENTS

| | | |
|---|---|---|
| JP | 02-232795 A | 9/1990 |
| WO | WO 02/06949 A2 | 1/2002 |
| WO | WO 02/37061 A1 | 5/2002 |

OTHER PUBLICATIONS

Doppelhammer et al., "Database performance in the Real World: TPC-D and SAP RI3," 1997, ACM, p. 123-124.

Hagmann et al., "Performance Analysis of Several Back-End Database Architectures," ACM Transactions on Database Systems, Mar. 1986, p. 1-26, vol. 11, No. 1, ACM.

Lightstone et al., "Autonomic Computing for Relational Databases: The Ten-Year Vision," IEEE, Aug. 2003, pp. 419-424.

Lightstone, S.S. et al., "Toward Autonomic Computing With DB2 Universal Database," SIGMOND Record, Sep. 2002, vol. 31, No. 3, pp. 55-61.

Lohman, G.M. et al., "SMART: Making DB2 (More) Autonomic," Proceedings of the 28th VLDB Conference, Hong Kong, China, 2002, 3 pages.

Ryu et al., "Analysis of Database Performance with Dynamic Locking," Journal of the Association for Computing Machinery, Jul. 3, 1990, p. 491-523, vol. 37, No. 3, ACM.

Stonebraker et al., "Performance Enhancements to a Relational Database System," ACM Transactions on Database Systems, Jun. 2, 1983, p. 167-185, vol. 8, No. 2, ACM.

International Search Report mailed on Jan. 4, 2005, for PCT Application No. PCT/US04/29069, filed on Sep. 3, 2004, 1 page.

"Software Monitor for Performance Tuning a Virtual Memory Computer System", IBM Technical Disclosure Bulletin, May 1973, vol. 15, Issue 12, p. 3730-3733, IBM.

* cited by examiner

AUTOMATIC WORKLOAD REPOSITORY BATTERY OF PERFORMANCE STATISTICS

CROSS-REFERENCES TO RELATED APPLICATIONS

This application is a non-provisional of U.S. Provisional Application Ser. No. 60/500,869, filed Sep. 4, 2003, the contents of which are hereby incorporated by reference.

BACKGROUND OF THE INVENTION

The present invention relates generally to database management, and more particularly to the collection and analysis of database statistics.

For most database systems, the tasks of performance monitoring and tuning of the database requires the use of sophisticated tools to collect information and analyze the performance of the database system during the execution of a workload. Such methods can often be costly and inefficient to database users. Database performance is typically characterized by the cumulative amount of time users spend waiting for the database server to respond to their requests. System performance statistics are commonly needed for analysis when a problem has been reported to the administrator of the database system. For example, users may experience unsatisfactory response time while browsing web pages that require fetching data from the database. Each problem could have numerous potential causes, such as, for example, an undersized buffer cache, a badly written application or SQL, bad SQL plans due to stale optimizer statistics, etc.

Collecting performance-related data after the fact may sometimes produce fruitless results, as some problems are timing related. This is analogous to taking pictures of a crime scene to catch a criminal after the crime has been committed. Also, existing mechanisms to collect system data are generally difficult to develop and maintain as they involve data selection, storage, analysis, and the disposal of old data in order to free up space for future data collection. This usually incurs extra cost to database customers as they have to purchase sophisticated monitoring tools from third party vendors, as well as hire experienced database administrators to run these tools for monitoring and tuning purposes.

Collecting the right set of performance data is one key to identifying the most sever bottlenecks in the system. For example, under-collecting performance data may cause self-tuning advisors to provide the wrong recommendations or may result in undertaking incorrect remedies. Over-collecting performance data, on the other hand, may result in wasted system resources (e.g., storage space and processor usage) and in an unnecessarily large amount of analysis time.

Accordingly, it is desirable to provide systems and methods that track and store performance-related information in a database system. Such performance-related information should include the right amount and type of information and statistics useful for automatically tuning and analyzing database system performance in an efficient manner.

BRIEF SUMMARY OF THE INVENTION

The present invention provides a self-managing workload repository infrastructure (or "AWR" for Automatic workload repository) which is useful for a database server to collect and manage useful system performance statistics. According to one aspect of the present invention, the AWR runs automatically to collect performance data about the operation of the database system, e.g., Oracle database system, and stores the data that it captures into the database. Because the collection process is done inside the database, the collection process is highly efficient as data is retrieved directly from the shared memory of the database kernel.

In one aspect, the AWR infrastructure of the present invention is completely self managed and does not require any additional management intervention. In this aspect, automatic collection of selected performance statistics is performed by a system process based on a schedule. The collection of system statistics is performed at a very low cost, and does not cause any noticeable degradation to the operation of the customer's database. If the customer's applications are experiencing some performance problems, the collected performance statistics are readily available for use by system self-tuning advisory modules (advisors) to analyze and tune the system and by database administrators.

The AWR is advantageously designed to be lightweight and to self manage its use of storage space so as to avoid ending up with a repository of performance data that is larger than the database that it is capturing data about. The data captured allows both system level and user level analysis to be performed without unduly impacting system performance, e.g., by eliminating or reducing the requirement to repeat the workload in order to diagnose problems. In one embodiment, the AWR is configured to automatically capture snapshots of statistics data on a periodic basis as well as purge stale data on a periodic basis. For example, in a default configuration, the AWR automatically captures statistics data snapshots every 60 minutes and purges data that is over 7 days old. Both the frequency of the statistics data capture and length of time for which data is kept is adjustable. Manual snapshot capture and purging may also be performed.

In certain aspects, the captured performance data includes one or more of the top N (e.g., 20 or 30) statistics for activities involving a large set of objects, time-based statistics, cumulative statistics, sampled data and metrics. The top N statistics captured include the most active SQL statements during a capture period based on, e.g., number of parses, memory usage, processor usage, elapsed time, etc. Time based statistics include data indicating where users are spending time in the database, such as logins per second, parses per second, etc. Cumulative statistics include data representing a running total of events at each collection time for each of a plurality of activities. Cumulative statistics may be used to compute an actual amount of activities during a time interval. For example, where users calls is an event, the system may compute the number of user calls between two collection times (e.g., Val(11 AM)-Val(10 AM)). Sampled data include data that represent the state of the system at each point in time. Active Session History ("ASH") data are examples of sampled data. Metrics are data derived from raw statistics and are typically used for graph plotting and user consumption. Examples of metrics include system response time per call and buffer cache hit ratio.

Optimizations are included in certain aspects to ensure that the capture of data is performed efficiently to minimize overhead. For example, one such optimization is in the SQL statement capture; working within the database, deltas (changes) of the data for SQL statements between snapshots are maintained. Maintaining deltas allows the system to quickly determine the statements that have significantly impacted the load of the system (across a number of different dimensions such as CPU and elapsed time) since the previous snapshot, rather than having to calculate the deltas by comparing current statistics for all SQL statements with the values collected at the last snapshot. This both improves the performance of the SQL capture and greatly reduces the number of SQL statements that are captured over time. In one aspect, statements are captured based on the cumulative impact of all executions over the time period, so for example, a heavily executed statement that completes in less than one second per execute will be captured alongside a single parallel query that ran for 15 minutes.

According to one aspect of the present invention, a method is provided for collecting performance statistics in a database system. The method typically includes automatically retrieving a set of one or more performance statistics types from within the database, and storing the retrieved statistics to the database.

According to another aspect of the present invention, a computer readable medium is provided that includes code for controlling a database system to collect performance statistics in the database system. The code typically includes instructions to automatically retrieve a set of one or more performance statistics types from within the database, and store the retrieved statistics to the database.

According to yet another aspect of the present invention, a database system is provided that typically includes a database for storing data objects, and a database control process configured to control operation of the database. The control process typically executes in a process space and is configured to access the data objects responsive to client requests. The system also typically includes a system process that executes in the process space, and which is configured to automatically retrieve a set of one or more performance statistics types from within the database, and store the retrieved statistics to the database. The process space is typically implemented in one or multiple processor units.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF THE INVENTION

The present invention provides systems and methods to automatically capture, store and manage database statistics data.

General Overview

The present invention provides, in one aspect, a workload repository (WR) module that automatically collects and stores database performance statistics. Collecting historical database statistics data is useful to allow analysis of performance problems that occurred in a previous period. Many performance problems are intermittent. Many times when a problem is reported, the problem is no longer happening. If the system has a record of what was going on in the system, it is typically much easier to identify the problems that caused the slowdown. Collecting historical database statistics data is also useful to use as a baseline for comparison with the current performance of the system. As workload changes, such comparisons are useful for identifying and predicting potential bottlenecks in the system.

Accordingly, the workload repository (WR) includes, in one aspect, a collection of persistent system performance statistics that may be used by internal clients, such as Advisory modules, for self-tuning and that is accessible by external clients and users. The collected statistics data is stored in a system-defined WR schema.

In one aspect, the WR maintains a schedule of capture times at which the system will automatically capture statistics that reflect the activities of the system up to the capture time. By regularly capturing such statistics, system monitoring and tuning advisors are able to use such statistics to automatically perform analysis for any time interval within which performance data is available. In one aspect, the capturing period is set to a default time interval, such as 60-minutes. In one aspect, WR aligns the scheduled capture time to the top of the hour whenever possible. The statistics collection process is preferably synchronized with database tuning advisors (e.g., ADDM and others as will be discussed below) to perform immediate analysis after the collection process. This allows problems to be detected at the earliest possible time.

To be totally self-managed, the WR in one aspect provides an automatic mechanism to periodically purge data that has become obsolete. This purging of data is automatically done based on a regular schedule, e.g., a user-configurable period, defaulting to 7 days. To further avoid system degradation, the WR is configured to perform maintenance tasks inside of a user-designated Maintenance Window wherever possible. Also, to provide optimal access paths for clients, WR ensures that Optimizer statistics are generated automatically on newly collected data. Further, to provide efficient data removal, a partitioning scheme is used for storing large datasets. The partition management is automated and hidden from users.

For statistics data whose volume varies based on the size of the system, the WR is configured in one aspect to only collect data that belongs to the (top) most active set of entities (potential bottlenecks). For example, performance data for SQL executions are collected only on the most active, e.g., 20 or 30, SQL statements based on criteria such as elapsed and cpu times. By limiting such collections, the WR is able to guarantee a relatively predictable space consumption, as well as a predictable amount of time needed for data analysis, without sacrificing the ability of the captured performance data to be used for identifying bottlenecks.

In preferred aspects, the workload repository provides support for managing snapshots and baselines, which includes their creation and deletion, as well as the retention and comparisons of data using snapshots and baselines. A snapshot is a collection of database performance statistics that are captured at a certain point in time. For cumulative statistics, data from two snapshots can be used for computing changes (deltas) in the statistics during that period of time. Such deltas can be used to obtain rates of changes. For example, the number of buffer gets per seconds between 3 PM and 4 PM may be determined using snapshots taken at those two points in time. A baseline is a set of statistics during a period in the past. In one aspect, a baseline can be defined as a pair of snapshots. Users may set up baselines from some representative periods in the past, to be used for comparisons with the current system behavior. U.S. Non-provisional application Ser. No. [attorney docket no. 021756-004700US; client ID OID-2003-211-01], entitled "Database Performance Baselines", filed on even date herewith, the contents of which are hereby incorporated by reference, discusses additional aspects and features of baselines.

System Framework Architecture

Figure 1:
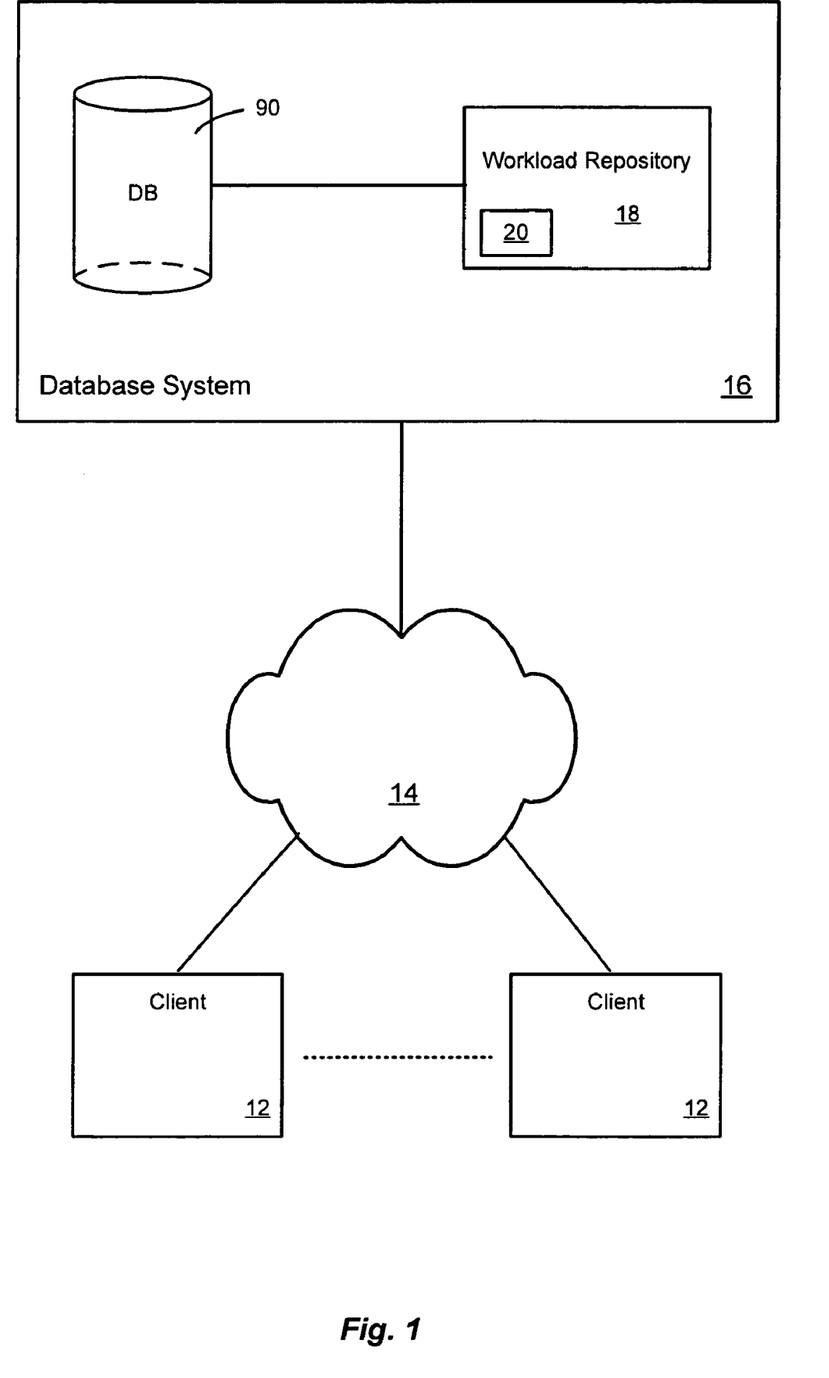
FIG. 1 illustrates a database system wherein an automatic workload repository system framework according to the present invention might be used.

FIG. 1 illustrates a database system 16 wherein a system 18 for collecting database performance statistics, such as an automatic workload repository system framework, might be used. As illustrated in FIG. 1 any user systems 12 might interact via a network 14 with database system 16. The users of those user systems 12 might be users in differing capacities and the capacity of a particular user system 12 might be entirely determined by the current user. For example, where a developer is using a particular user system 12 to interact with database system 16, that user system has the capacities allotted to that developer. However, while an administrator (e.g., DBA) is using that user system to interact with system 16, it has the capacities allotted to that administrator. System 16 also includes, in one aspect, a separate storage module (not shown), such as one or more hard disks for storing collected statistics and other data.

In one aspect, an enterprise management ("EM"; not shown) module is provided to expose the workload repository and other internal and external clients to an external user. For example, the EM provides, in one aspect, a graphical user interface (GUI) that allows a user to interact with the workload repository and various internal and external client modules. Thus, in one aspect, an external client such as a database administrator, using a browser on client system 12, may interact with a GUI module (e.g., enterprise management module) to access data and to view reports generated using workload repository 18.

Network 14 can be a LAN (local area network), WAN (wide area network), wireless network, point-to-point network, star network, token ring network, hub network, or other configuration. One of the most common type of network in current use is a TCP/IP (Transfer Control Protocol and Internet Protocol) network such as the global internetwork of networks often referred to as the "Internet" with a capital "I". For example, user systems 12 might communicate with system 16 using TCP/IP and, at a higher network level, use other common Internet protocols to communicate, such as HTTP, FTP, AFS, WAP, etc.

Several elements in the system shown in FIG. 1 include conventional, well-known elements that need not be explained in detail here. For example, each user system 12 could include a desktop personal computer, workstation, laptop, PDA, cell phone, or any WAP-enabled device or any other computing device capable of interfacing directly or indirectly to the Internet or other network connection. User system 12 typically runs a client interface module, such as an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., DBA) of user system 12 to access, process and view information and pages available to it from system 16 over network 14. Each user system 12 also typically includes one or more user interface devices, such as a keyboard, a mouse, touch screen, pen or the like, for interacting with a graphical user interface (GUI) provided on a display (e.g., monitor screen, LCD display, etc.) in conjunction with pages, forms and other information provided by system 16 or other systems or servers. The client interface module of system 12 typically implements or interfaces with a server module (not shown, but may be referred to herein as an Enterprise Management module) configured to create web pages for display on client 12 in response to requests from client 12. As discussed above, the present invention is suitable for use with any type of network such as the Internet, an intranet, an extranet, a virtual private network (VPN), a non-TCP/IP based network, any LAN or WAN or the like.

According to one embodiment, each user system 12 and all of its components are operator configurable using applications, including computer code run using a central processing unit such as an Intel Pentium processor or the like. Similarly, database system 16 and all of its components might be operator configurable using application(s) including computer code run using a central processing unit such as an Intel Pentium processor or the like, or multiple processor units. Computer code for operating and configuring database system 16 to intercommunicate and to process and store tables, pages and other data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C++, HTML, Java, JavaScript, or any other scripting language, such as VBScript, Perl, Python, or TCL.

According to one embodiment, system 16 includes a database 90 for storing objects and data according to various object schema. For example, database 90 typically stores data created and used by an enterprise. In one embodiment, database 90 is a relational database, and database system 16 implements a database server management application (e.g., Oracle 9i or 10g) adapted to store, update and retrieve data based on SQL-formatted and other types of commands. If more than one database system is used, they may be located in close proximity to one another (e.g., in a server farm located in a single building or campus), or they may be distributed at locations remote from one another (e.g., one or more servers located in city A and one or more servers located in city B). The system 16, in one aspect, could be implemented in a standalone system with an associated data storage repository or database, or it could include one or more logically and/or physically connected servers distributed locally or across one or more geographic locations. Additionally, the term "server" is meant to include a computer system, including processing hardware and process space(s), and an associated database storage system and database server application (e.g., Oracle RDBMS such as Oracle 9i or 10g) as is well known in the art. It should also be understood that "server system" and "server" may be used interchangeably herein. Similarly, the databases described herein can be implemented as single databases, a distributed database, a collection of distributed databases, a database with redundant online or offline backups or other redundancies, etc., and might include a distributed database or storage network and associated processing intelligence. The database may also be implemented in a clustered environment.

In one aspect, a variety of internal database clients may interact with, and access information and statistics data collected and stored in, the workload repository 18. Internal clients might include internal database tuning advisory modules such as a SQL advisory, an Object Advisory and others. Another internal client might be an Automatic Database Diagnostic Monitor (ADDM). Various aspects of such internal database client modules and others can be found in U.S. Non-provisional application Ser. No. 10/775,513, entitled "The Time Model", filed Feb. 9, 2004; U.S. Non-provisional application Ser. No. 10/775,733, entitled "Capturing Session Activity as In-Memory Snapshots Using a Time-Based Sampling Technique Within a Database for Performance Tuning and Problem Diagnosis", filed Feb. 9, 2004; U.S. Non-provisional application Ser. No. 10/775,531, entitled "Automatic Database Diagnostic Monitor Architecture", filed Feb. 9, 2004; U.S. Provisional Application Ser. No. 60/500,869, entitled "Self Managing Database Architecture", filed Sep. 4, 2003; and U.S. Provisional Application Ser. No. 60/500,864, entitled "Automatic Database Diagnostic Monitor Architecture", filed Sep. 5, 2003, the contents of which are hereby incorporated by reference. The various Advisory modules described in these applications use the collected statistics stored in the AWR to perform self-monitoring and advice generation functions in an autonomous, proactive manner.

Workload Repository Schema

Figure 2:
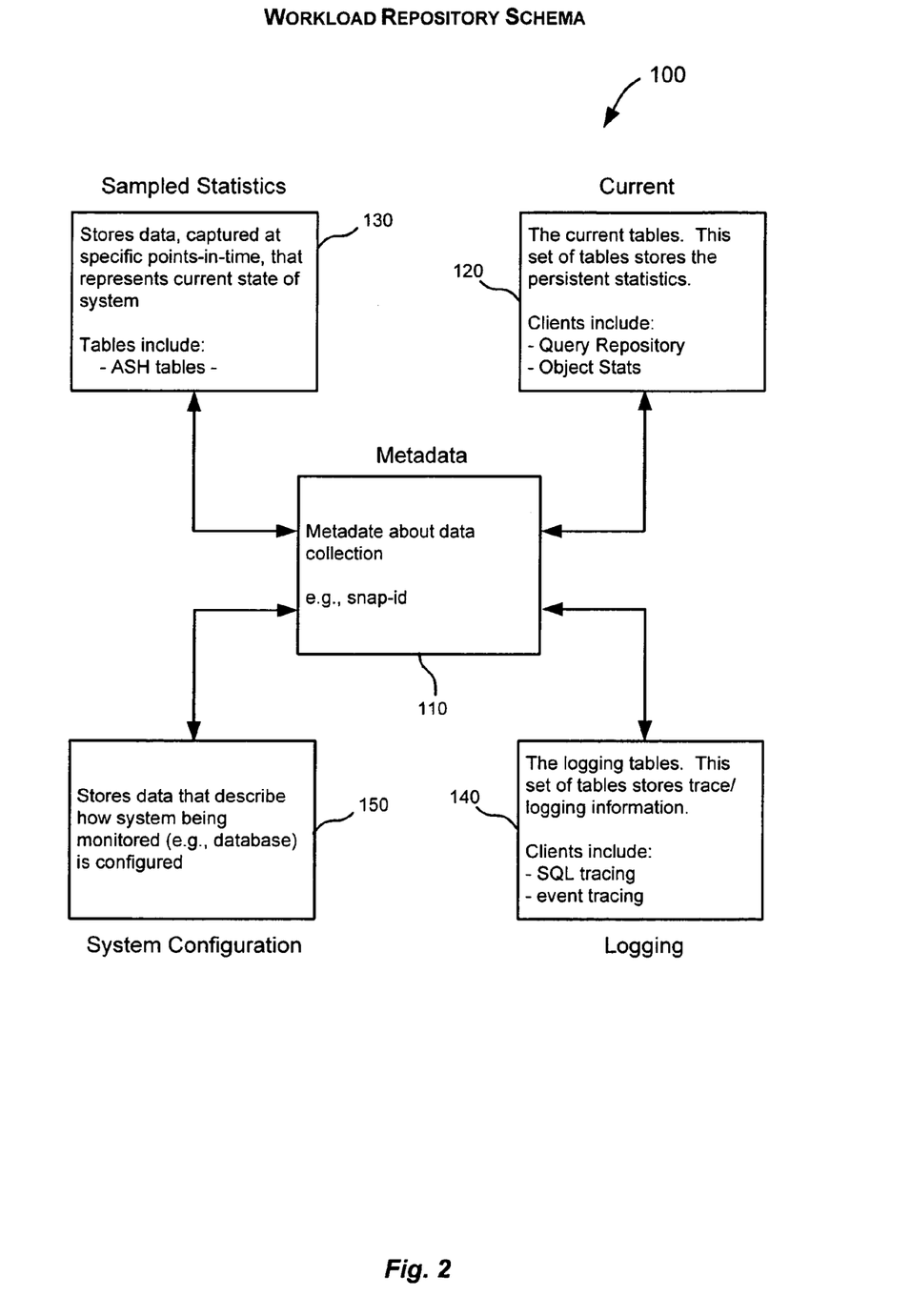
FIG. 2 illustrates a workload repository schema according to one embodiment of the present invention.

FIG. 2 illustrates a workload repository schema 100 according to one embodiment of the present invention. As shown, in one aspect, schema 16 includes four types of WR tables. Metadata 110, is used to tie the WR tables together. For example, in one embodiment as will be described in more detail below, a snaphot_id, or snap_id is used to tie entries in the WR tables together. The current tables 120 and sampled statistics tables 130 store statistical information about the database. The logging tables 140 provide generic logging and tracing capabilities to clients of the database server. System configuration tables 150 provide support for internal infrastructure (e.g., RDBMS components) clients. Referring back to FIG. 1, in one embodiment, schema 100 including the statistics and data are stored in tablespace 20 of WR 18. Tablespace 20 itself is stored in the database. A background process executing in database system 16 runs various tasks to retrieve statistics from database 90, store retrieved statistics to schema 100, and execute processing tasks, such as purging and metric computation as will be described later.

Sampled statistics tables 130 contain a history of performance statistics data. They contain samples collected in memory since the last snapshot time by sampling components such as a metrics component (e.g., metrics are calculated every minute) and ASH (e.g., samples active sessions every second). System configuration tables 150 provide configuration information about the database (e.g., configuration parameter settings, software version, disk space, number of CPUs, etc.) captured during snapshots to be used and analyzed by auto tuning advisors.

Current tables 120 store the latest set of statistics that was transferred from memory to disk, e.g., the current values of statistics at each snapshot time. Storing a current, persistent on-disk copy of in-memory statistics allows statistics to survive instance crashes. If an instance unexpectedly crashes, these current statistics can be loaded from disk into memory once the instance restarts. Also, current tables can be used for memory overflow in case virtual memory is needed for a particular set of statistics.

Logging tables 140 are used for logging data and tracing information. An example of a client for this type of table is SQL trace. Clients use a system-defined API that allows them to write logging and tracing information into the workload repository in an efficient manner. The method of collecting the trace information into the logging tables is transparent to the user. The user may control the logging of data through ON/OFF parameters. Entries in logging tables 140 are typically not tied to snapshots, although entries may be correlated by timestamps to snapshots Co-pending U.S. Non-provisional application Ser. No. [attorney docket no. 021756-003900US; client ID OID-2003-193-01], entitled "Automatic Workload Repository the Self-Managing Performance Statistics Collection Infrastructure", filed on even date herewith discloses additional aspects and features of the AWR and is hereby incorporated by reference in its entirety.

Snapshots

A snapshot is a set of history of performance statistics captured in the workload repository at a certain time in the past. The most common source of data comes from in memory performance statistics available by reading memory directly or through SQL type APIs. The most common use of snapshots is for computing the rate of change of a statistic over a period of time and using it for performance analysis. In such cases, the changes in values between two snapshots may be computed using the cumulative values at the begin and end snapshots of the time period. For example, the average number of physical reads of the system between a time period may be determined by using the physical_reads statistics in a buffer pool statistics table.

Many statistics are tracked using cumulative totals. For example, the physical_reads statistics tracks the total number of physical_reads since the start of an instance. In certain aspects, the changes, or delta values, of some statistics are tracked. For example, for SQL statements delta values for parse calls, elapsed time, and other statistics are tracked.

Each snapshot is preferably identified by a snapshot sequence number (snap_id) that is unique within the workload repository. For example, in one aspect, each row in the Sampled statistics tables 130 is tagged with a snapshot_id, which represents the time when the data is captured to disk. A snapshot metadata table stores the mapping between the snapshot_id and the actual wall-clock time.

The sampled statistics tables 130, in one aspect, are organized into the following categories:
1. File Statistics
2. General System Statistics
3. Concurrency Statistics
4. Instance Tuning Statistics
5. SQL Statistics
6. Segment Statistics
7. Undo Statistics
8. Time Model Statistics
9. Recovery Statistics Snapshots can be generated automatically and manually. For statistics that track delta values, the deltas are computed for the period between the last snapshot and the current snapshot. The workload repository preferably does not differentiate between manual or automatically generated snapshots. The system may be analyzed using any pair of snapshots.

Users can control the set of statistics to capture by using a STATISTICS-LEVEL parameter that determines the type and amount of statistics that will be captured. Such a parameter may range from Off indicating that no statistics will be captured to ALL indicating that the entire set of statistics types stored in WR will be collected, and one or more various levels in between indicating that a subset of all statistics types will be collected.

In a clustered database environment (multiple database engines on multiple machines with shared access to a single set of database files), each snapshot captures data from the entire database cluster. In one aspect, each snapshot captures data from all clustered database nodes in the same cluster. To make sure snapshots capture information that describes the cluster with respect to a certain point in time, data from each node is retrieved at around the same wallclock time, and is tagged with the same snapshot id. In another aspect, captured data is stored separately for each individual cluster database node, and is tagged with a unique id. For example, the buffer_busy_wait statistics shows the number of buffer waits on each individual node.

If file names, statistic names, and SQL text are blindly captured for every single snapshot, the amount of space needed for snapshots can become quite large. To achieve more efficient space usage for the workload repository, in one aspect, the WR stores statistic names, parameter names, file names and sql text separate from the actual statistic values, and eliminates duplicate entries.

Text for Statistic Names

When the WR is queried for a statistics value, it can be done by either identifying the statistics by the name or a hash value derived from the name. The hash is shorthand for the name, and views are provided that externalize the statistics hash-to-number mapping. For example, a statname table shows the mapping between a session/system statistics name and a hash, and statname can be used to query the desired statistics in a system statistics ("sysstat") table and a session statistics ("sesstat") table. The statistics name-to-hash mappings are preferably static across database versions and OS platforms.

File Names

In certain aspects, tables are provided to store the names of datafiles, tempfiles, and tablespace in a location separate from where the statistics are stored. Storing the file name only once in the workload repository provides a large space savings. When a new file is detected, information such as the file#, creation_change#, and filename are recorded in these new tables. The next time this file is seen, the filename does not have to be recorded again, and only the file#, creation_change#, and file statistic values need to be stored in the statistics tables. To retrieve the file statistics information by the file name, a join may be performed on the (file#, creation_change#) key using the file statistics and file name tables.

SQL Text

A SQLTEXT table is used to store the complete SQL statement text in a location separate from where the SQL statistics are stored. In one aspect, the text for a SQL cursor is captured only once per appearance in the shared pool. This saves space as the SQL text can be many bytes.

When capturing the SQL statistics, if the SQL text does not exist in the SQLTEXT table, an entry that includes the SQL hash value, length of the SQL statement, address, command type, and SQL text is inserted into the SQLTEXT table. If the SQL text already exists in SQLTEXT, no rows need be inserted into this table.

TOP N SQL Statistics

SQL statistics are one of the most important kind of statistics used for performance analysis. Since there are usually a large number of SQL statements in the shared SQL cache, efficient capturing of SQL statistics can become tricky. If everything in the shared SQL cache is blindly captured, the amount of information captured can be unnecessarily large. For example, in a large system, the shared SQL cache can hold more than 20,000 SQL statements. Drawbacks to such an approach include taking a long time to flush and taking up a large amount of disk space.

In one aspect, to reduce the volume of captured data, only the top consumers are captured based on several criteria. Using delta values maintained between snapshots, the top set of SQL statements by any criteria can be determined by a single pass of the SQL statistics values. The delta values for SQL statistics are made available by saving the current values of statistics to memory when a snapshot occurs, and then subtracting the current from the saved value when the next snapshot occurs. For efficiency, the statistics as of the last snapshot for a given SQL statement are saved on the first execution of a SQL statement after the snapshot occurs. Any SQL statement without saved values since the last snapshot is assumed to have 0 delta values for all statistics.

Top N Segment Statistics

TopN segment statistics are captured in ways similar to SQL statistics. Examples of segment statistics for capture include:

unused space,
number of buffers in cache,
number of rows, and
full table scans.

Additional statistics useful for Object Space Advisories include:

space used (deltas in bytes),
space allocated (deltas in bytes),
row piece access count,
non-head piece access count, and
non-tail row piece access count where row piece size<½ maximum row pick size for block.

Active Session History/Sampled Data

In one aspect, Active Session History (ASH) data is stored persistently in the WR. ASH data is particularly useful for the ADDM. While the snapshot data provides an overview of how the system is performing, the WR-ASH data provides detailed drill-down information. The snapshot data combined with the ASH data provides a complete picture of the system. Flushing shapshots and ASH data for the same time period allows the users to see a more complete picture.

Unlike regular snapshot data, the WR-ASH data is not directly tied to specific snapshots. Instead data is collected at much smaller time intervals between two snapshots. Because of this, each WR-ASH data is not associated directly with a snapshot. Each data is associated with a timestamp that is tracked and understood by a control module, e.g., the ADDM.

In one aspect, moving of ASH data to disk occurs at the same time snapshots are taken.

Since, in one aspect, the ASH is implemented using a circular buffer in memory, data may need to be flushed to disk before they are overwritten. It is possible that the circular buffer is filled before a snapshot occurs. In such cases, a request will be made to the system to perform and emergency flushing of ASH data to free up space.

In one aspect, the WR snapshot data is purged periodically to avoid overuse of disk space, for example, based on a RETENTION setting controlled by users. The WR-ASH data is preferably purged based on the same retention scheme. For example, a nightly task might be performed to purge data from the Workload Repository.

In one aspect, ASH data is collected once every second. Thus, the amount of data for a 60-minute interval can take up as much as 60 MB on a busy system. Retaining such data for a month may require close to 10 GB of disk space. To reduce the amount of disk space usage, the in-memory data is filtered before flushing to disk using a time-based reduction scheme, e.g., a 10-to-1 reduction scheme.

U.S. Non-provisional application Ser. No. 10/775,733, entitled "Capturing Session Activity as In-Memory Snapshots Using a Time-Based Sampling Technique Within a Database for Performance Tuning and Problem Diagnosis", filed Feb. 9, 2004, discusses additional aspects of ASH and ASH statistics, and is hereby incorporated by reference in its entirety.

Snapshot Purging Policy

To make room for capturing new statistics, old snapshots are purged automatically and periodically in one aspect, e.g., every night. A background process runs a purge task in a predefined window of time, "the Management Window", if possible. The amount of historical statistics retained in the workload repository can be controlled by a retention setting. In one aspect, snapshots are removed automatically based on chronological order. Snapshots that belong to baselines are retained until their baselines are removed. Old data is deleted as snapshots are removed. When a shapshot is identified to be removed, the entire set of data belonging to the snapshot is preferably removed.

Metrics

In one aspect, the workload repository supports metrics, which are secondary statistics that are derived from base statistics. Examples of a base statistic are the number of reads per second performed on a particular database object and the number of user logins per second. Examples of metrics include a measure of the number of logons per second within a certain period and the average number of physical reads performed on a database object within the last 60 minute time period. Metrics are used frequently by internal clients to determine the health of the system, for early warning problem detection and self tuning. Since such metrics are needed frequently, metrics for important activities (vital signs) are provided to the system. The number of buffer gets, number of transactions, and number of logons are examples of important metrics. In one aspect, metrics for commonly needed periods are computed automatically. For example, the time periods of 5 seconds, 15 seconds, and 60 seconds are a reasonable set of periods for computing metrics. Pre-computation of metrics allows internal clients to quickly compute the rate of change of database statistics.

Additional examples of metrics includes
Database Time Per Sec
SQL Service Response Time
Response Time Per Txn
Redo Generated Per Txn
Executions Per Txn
Logical Reads Per Txn
Total Parse Count Per Txn
Enqueue Requests Per Txn
DB Block Changes Per Txn
User Transaction Per Sec
User Calls Per Sec
Logons Per Sec
Executions Per Sec
Current Logons Count
Total Parse Count Per Sec
Physical Reads Per Sec
Physical Writes Per Sec
CPU Usage Per Sec
Network Traffic Volume Per Sec
Redo Generated Per Sec While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of self-tuning a database management system in response to collecting performance statistics measuring an operational performance of the database management system, the method comprising:

selecting, with a workload repository module that collects performance statistics from a shared memory of a database kernel of a database management system provided by a set of one or more computer systems and that executes as an internal system process of the database management system, one or more categorical types of performance statistics to capture within the database management system from a plurality of categorical types of performance statistics, wherein each of the performance statistics is organized into a categorical type of the plurality of categorical types and a level of the categorical type, the level being a subset of the categorical type;

capturing a set of performance statistics from the shared memory of the database kernel of the database management system with the workload repository module according to the one or more selected categorical types of performance statistics, wherein each captured performance statistic of the set of performance statistics is organized into a categorical type that matches the one or more selected categorical types of performance statistics;

storing the set of performance statistics by the workload repository module in a database of the database management system based on a database schema configured for performance statistics;

extracting a subset of the set of performance statistics from the database of the database management system by a database client executing as an internal system process of the database management system provided by the one or more computer systems according to the database schema for performance statistics;

analyzing the subset of the set of performance statistics with the database client according to one or more tuning models provided by the database client; and tuning the operational performance of the database management system in response to a result of the analysis of the subset of the set of performance statistics by the database client.

2. The method of claim 1, further including receiving an indicator signal from an advisory module executing as an internal system process of the database management system provided by the one or more computer systems, said indicator signal identifying for capture at least one of the one or more categorical types of performance statistics selected by the workload repository module.

3. The method of claim 1, further including receiving an indicator signal from a user via a user interface device configured to communicate with the database management system provided by the one or more computer systems, said indicator signal identifying for capture at least one of the one or more categorical types of performance statistics selected by the workload repository module.

4. The method of claim 1, wherein capturing the set of performance statistics from the shared memory of the database kernel of the database management system with the workload repository module according to the one or more selected categorical types of performance statistics includes determining a series of one or more time intervals at the workload repository module and successively capturing the set of performance statistics at every time interval in the series.

5. The method of claim 1, wherein the set of performance statistics includes a set of most active SQL statements determined by the workload repository module based on one or more of highest amount of processor usage, highest amount of elapsed time usage, highest number of parses, highest amount of memory usage and highest number of child cursors that are captured.

6. The method of claim 1, wherein the set of performance statistics includes a cumulative value for a performance related statistic determined by the workload repository module.

7. The method of claim 6, wherein the cumulative value is incremented by the workload repository module at each of a plurality of statistical events associated with the performance related statistic.

8. The method of claim 1, wherein the stored set of performance statistics includes one or more metric values derived by the workload repository module from one or more of said statistics.

9. The method of claim 8, wherein the metric values include one of values representing the database management system response time per call and values representing a buffer cache hit ratio.

10. The method of claim 1, further including calculating with the workload repository module one or more metric values based on the stored set of performance statistics.

11. The method of claim 1, wherein the set of performance statistics include cumulative values for one or more activities.

12. The method of claim 11, wherein the one or more activities includes one of a number of user calls and a number of login requests.

13. The method of claim 1, further including:
receiving a request from the database client at the database management system to access the stored set of performance statistics; and
allowing the database client to access the particular stored set of performance statistics identified in the request to enable self-tuning by the database management system.

14. The method of claim 1, further including:
determining at the workload repository module whether to purge performance statistics stored in the database of the database management system based on order in which performance statistics are stored in the database; and
purging said stored set of performance statistics by the workload repository module based on the order said set of performance statistics were stored in the database of the database management system.

15. The method of claim 1, wherein the workload repository module is implemented by a system process executing in a process space of a first computer system of the database management system in the set of one or more computer systems.

16. The method of claim 15, wherein the process space includes multiple processor units and associated memory units.

17. A computer-readable storage medium configured to store a set of code modules executable by one or more processors of a set of one or more computer systems for controlling self-tuning of a database management system in response to collecting performance statistics measuring an operational performance of the database management system, the computer-readable storage medium comprising:
code for selecting, at a workload repository module that collects performance statistics from a shared memory of a database kernel of a database management system and that executes as an internal system process of the database management system, one or more categorical types of performance statistics to capture from a plurality of categorical types of performance statistics, wherein each of the performance statistics is organized into a categorical type of the plurality of categorical types and a level of the categorical type, the level being a subset of the categorical type;
code for capturing a set of performance statistics from the shared memory of the database kernel of the database management system with the workload repository module according to the one or more selected categorical types of performance statistics, wherein each performance statistic of the set of performance statistics is organized into a categorical type that matches the one or more selected categorical types of performance statistics;
code for storing the set of performance statistics by the workload repository module in a database of the database management system based on a database schema configured for performance statistics;
code for extracting a subset of the set of performance statistics from the database of the database management system with a database client executing as an internal system process of the database management system according to the database schema for performance statistics;
code for analyzing the subset of the set of performance statistics with the database client according to one or more tuning models provided by the database client; and
code for tuning the operational performance of the database management system in response to a result of the analysis of the subset of the set of performance statistics by the database client.

18. The computer-readable storage medium of claim 17, further including:
code for receiving an indicator signal from an advisory module executing as an internal system process of the database management system, said indicator signal identifying for capture at least one of the one or more categorical types of performance statistics selected by the workload repository module.

19. The computer-readable storage medium of claim 17, further including:
code for receiving an indicator signal is received from a user via a user interface device, said indicator signal identifying for capture at least one of the one or more categorical types of performance statistics selected by the workload repository module.

20. The computer-readable storage medium of claim 17, wherein the set of performance statistics includes a set of most active SQL statements determined by the workload repository module based on one or more of highest amount of processor usage, highest amount of elapsed time usage, highest number of parses, highest amount of memory usage and highest number of child cursors that are captured.

21. The computer-readable storage medium of claim 17, wherein the set of performance statistics includes a cumulative value for a performance related statistic determined by the workload repository module.

22. The computer-readable storage medium of claim 21, wherein the cumulative value is incremented by the workload repository module at each of a plurality of statistical events associated with the performance related statistic.

23. The computer-readable storage medium of claim 17, wherein the stored set of performance statistics includes one or more metric values derived by the workload repository module from one or more of said statistics.

24. The computer-readable storage medium of claim 23, wherein the metric values include one of values representing database management system response time per call and values representing a buffer cache hit ratio.

25. The computer-readable storage medium of claim 17, further including:
  code for automatically calculating one or more metric values with the workload repository module based on the stored set of performance statistics.

26. The computer-readable storage medium of claim 17, further including:
  code for receiving a request from the database client to access the stored set of performance statistics; and
  code for allowing the database client to access the particular stored set of performance statistics identified in the request to enable self-tuning by the database management system.

27. The computer-readable storage medium of claim 17, further including:
  code for determining at the workload repository module whether to purge performance statistics in the database of the database management system based on order in which performance statistics are stored in the database; and
  code for purging said stored set of performance statistics by the workload repository module based on the order said set of performance statistics were stored in the database of the database management system.

28. The computer-readable storage medium of claim 17, wherein the workload repository module is implemented by a system process executing in a process space of a first computer system in the set of one or more computer systems.

29. The computer-readable storage medium of claim 28, wherein the process space includes multiple processor units and associated memory units.

30. A self-tuning database management system comprising:
  a database for storing data objects collected from a shared memory of a database kernel of the database management system;
  a processor configured to execute, in a shared process space, a database management client process associated with the database and one or more background processes, the database management client process configured to manage the database and provide access to the data objects stored in the database responsive to a client request; and
  a memory coupled to the processor, the memory configured to store a plurality of instructions associated with the one or more background processes which when executed by the processor configure the processor to:
    select to capture one or more categorical types of performance statistics for measuring operational performance of the database management system from a plurality of categorical types of performance statistics, wherein each of the performance statistics organized into a categorical type of the plurality of categorical types and a level of the categorical type, the level being a subset of the categorical type;
    capture a set of performance statistics from the shared memory of the database kernel of the database management system according to the one or more selected categorical types of performance statistics, wherein each performance statistic of the set of performance statistics is organized into a categorical type that matches the one or more selected categorical types of performance statistics;
    store the set of performance statistics in the database based on a database schema configured for performance statistics;
    extract a subset of the set of performance statistics from the database according to the database schema for performance statistics;
    analyzing the subset of the set of performance statistics according to one or more tuning models; and
    tuning the operational performance of the database via the database management client process in response to a result of the analysis of the subset of the set of performance statistics according to the one or more tuning models.

31. The database management system of claim 30, wherein the processor is further configured to receive an indicator signal from an advisory module executing in the shared process space, said indicator signal identifying for capture at least one of the one or more categorical types of performance statistics selected by the processor.

32. The database management system of claim 30, wherein the processor is further configured to receive an indicator signal from a user via a user interface device, said indicator signal identifying for capture at least one of the one or more categorical types of performance statistics selected by the processor.

33. The database management system of claim 30, wherein the set of the performance statistics includes a set of most active SQL statements determined by the processor according to the one or more background processes based on one or more of highest amount of processor usage, highest amount of elapsed time usage, highest number of parses, highest amount of memory usage and highest number of child cursors that are captured.

34. The database management system of claim 30, wherein the processor includes multiple processor units and associated memory units.

35. The database management system of claim 30, wherein the processor is further configured to:
  determining whether to purge performance statistics stored in the database based on order in which performance statistics are stored in the database; and
  purge said stored set of performance statistics based on the order said set of performance statistics were stored in the database.

36. The database management system of claim 30, wherein values of the set of performance statistics are stored in a value table within the database and wherein at least one of statistic names, parameter names, and file names corresponding to the stored values of the set of performance statistics are stored in a name table within the database, the values being separately stored from the corresponding at least one of statistic names, parameter names, and file names.

37. The database management system of claim 36, wherein the set of performance statistics are extracted from the value table by mapping information provided by the name table.

38. The database management system of claim 30, wherein the processor is further configured to execute an advisory module within the shared process space to analyze the subset of the set of performance statistics and to provide recommended solutions for one or more detected problems.

* * * * *

UNITED STATES PATENT AND TRADEMARK OFFICE
CERTIFICATE OF CORRECTION

PATENT NO. : 7,603,340 B2
APPLICATION NO. : 10/934344
DATED : October 13, 2009
INVENTOR(S) : Gary Ngai et al.

It is certified that error appears in the above-identified patent and that said Letters Patent is hereby corrected as shown below:

On the title page, item (75), in column 1, in "Inventors", line 5, delete "Venkatatamani" and insert -- Venkataramani --, therefor.

On the title page, item (75), in column 1, in "Inventors", line 9, delete "Belmont," and insert -- San Mateo, --, therefor.

Title page, item (*) Notice: should read as follows: Subject to any disclaimer, the term of this patent is extended or adjusted under 35 U.S.C. 154(b) by 736 days.

In column 8, line 3, delete "snapshots" and insert -- snapshots. --, therefor.

Signed and Sealed this

Third Day of August, 2010

David J. Kappos
*Director of the United States Patent and Trademark Office*